US012609728B2

(12) United States Patent
Jedrzejewski et al.

(10) Patent No.: US 12,609,728 B2
(45) Date of Patent: Apr. 21, 2026

(54) FILTER UNIT FOR WIDEBAND MULTICARRIER FDD OPERATION

(71) Applicant: Telefonaktiebolaget LM Ericsson (publ), Stockholm (SE)

(72) Inventors: Piotr Jedrzejewski, Jarfalla (SE); Rui Hou, Taby (SE); David Scafe, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 320 days.

(21) Appl. No.: 18/570,421

(22) PCT Filed: Jun. 14, 2021

(86) PCT No.: PCT/SE2021/050572
§ 371 (c)(1),
(2) Date: Dec. 14, 2023

(87) PCT Pub. No.: WO2022/265540
PCT Pub. Date: Dec. 22, 2022

(65) Prior Publication Data
US 2024/0283482 A1     Aug. 22, 2024

(51) Int. Cl.
H04B 1/525          (2015.01)
H04B 1/00           (2006.01)

(52) U.S. Cl.
CPC ........... H04B 1/525 (2013.01); H04B 1/0057 (2013.01)

(58) Field of Classification Search
CPC ............................. H04B 1/525; H04B 1/0057
(Continued)

(56) References Cited

U.S. PATENT DOCUMENTS 5,963,587  A  * 10/1999  Kumagai ................. H04B 1/48
                                                         455/78
7,305,057  B1 * 12/2007  Miao .................. H04B 1/71635
                                                         375/135
(Continued)

FOREIGN PATENT DOCUMENTS

EP          2487800 A1      8/2012
EP          3068187 A1      9/2016
(Continued)

OTHER PUBLICATIONS

Cameron et al., "Microwave Filters for Communication Systems: Fundamentals, Design, and Applications", book, 2007, pp. 625-670, Chapter 18, John Wiley & Sons, Inc.

*Primary Examiner* — April G Gonzales
(74) *Attorney, Agent, or Firm* — FBT Gibbons LLP

(57)          ABSTRACT

There is provided a filter unit for wideband multicarrier FDD operation. The filter unit comprises an MXT, at least one isolator, and a filter bank. The MXT and the filter bank are connected via the at least one isolator. The MXT is configured to receive a TX wideband multicarrier signal as provided by at least one PA, and to 5 provide a first BP filtered TX wideband multicarrier signal to the at least one isolator. The MXT comprises at least one first BP filter structure for first BP filtering of the TX wideband multicarrier signal. The at least one isolator is configured to receive the first BP filtered TX wideband multicarrier signal from the MXT and provide the first BP filtered TX wideband multicarrier signal to the filter bank. The filter bank is 10 configured to receive the first BP filtered TX wideband multicarrier signal from the at least one isolator, and to provide a second BP filtered TX wideband multicarrier signal towards an antenna port. The filter bank comprises at least one more second BP filter structure than there are first BP filter structures for second BP filtering of the first BP
(Continued)

filtered TX wideband multicarrier signal to provide the second BP filtered 15 TX wideband multicarrier signal.

20 Claims, 8 Drawing Sheets

(58) Field of Classification Search
USPC ........................................................ 455/552.1
See application file for complete search history.

(56) References Cited

U.S. PATENT DOCUMENTS

| | | | | |
|---|---|---|---|---|
| 8,391,316 B2 * | 3/2013 | Gorostegui | .............. | H04B 1/06 |
| | | | | 725/38 |
| 8,954,025 B2 * | 2/2015 | Vogas | .................... | H04B 1/006 |
| | | | | 455/306 |
| 9,312,889 B2 * | 4/2016 | Li | ........................ | H04B 1/0475 |
| 10,027,006 B2 * | 7/2018 | Cheng | ...................... | H01P 5/16 |
| 10,044,375 B2 * | 8/2018 | Pham | ................... | H04B 1/0483 |
| 2002/0080728 A1 * | 6/2002 | Sugar | .................... | H04B 1/406 |
| | | | | 370/252 |
| 2008/0212502 A1 * | 9/2008 | Zhen | ...................... | H03F 3/602 |
| | | | | 370/295 |

| | | | | |
|---|---|---|---|---|
| 2010/0074240 A1 * | 3/2010 | Jian | ...................... | H04B 1/0057 |
| | | | | 370/339 |
| 2010/0296596 A1 * | 11/2010 | Miyamoto | ............ | H04L 5/0007 |
| | | | | 375/295 |
| 2012/0183096 A1 * | 7/2012 | Le Naour | ............ | H04B 1/0032 |
| | | | | 375/295 |
| 2013/0163648 A1 * | 6/2013 | Kennard | .................. | H04B 1/44 |
| | | | | 375/219 |
| 2017/0026061 A1 * | 1/2017 | Wloczysiak | ......... | H04B 1/0057 |
| 2018/0241109 A1 * | 8/2018 | Ashworth | .......... | H04B 7/15535 |
| 2018/0248569 A1 * | 8/2018 | Takenaka | ............. | H04B 1/0057 |
| 2018/0248676 A1 * | 8/2018 | Raggio | ............. | H04B 7/15542 |
| 2019/0098564 A1 * | 3/2019 | Gupta | ................... | H04W 52/26 |
| 2019/0181839 A1 * | 6/2019 | Bauder | ............. | H03H 9/02007 |
| 2019/0364492 A1 * | 11/2019 | Azizi | ............... | H04W 52/0264 |
| 2020/0267633 A1 * | 8/2020 | Bendlin | ............... | H04W 16/14 |
| 2020/0336900 A1 * | 10/2020 | Mueck | ................. | H04W 12/03 |
| 2021/0022071 A1 * | 1/2021 | Bendlin | ............... | H04W 48/16 |

FOREIGN PATENT DOCUMENTS

| | | | |
|---|---|---|---|
| EP | | 3251217 A1 | 12/2017 |
| WO | WO 2019245415 | | 12/2019 |

\* cited by examiner

FILTER UNIT FOR WIDEBAND MULTICARRIER FDD OPERATION

CROSS REFERENCE TO RELATED DATA

This application is a national-phase entry under 35 USC § 371 of International Application No. PCT/SE2021/050572, filed Jun. 14, 2021, titled "Filter Unit For Wideband Multicarrier FDD Operation," the contents of which are hereby incorporated herein in its entirety.

TECHNICAL FIELD

Embodiments presented herein relate to a filter unit for wideband multicarrier frequency-division duplexing operation and to a radio transceiver device comprising such a filter unit.

BACKGROUND

In general terms, in a multicarrier communication system several input carrier signals can be combined into one multicarrier signal output. Commonly this combining is performed at the transmitting side of a communication system. Devices that are configured to perform this combining are commonly called Radio Frequency (RF) combiners or Output Multiplexers (OMUX). On the receiving side of the communication system, the reverse operations are performed. One multicarrier signal is split into several single carrier signals. This is commonly referred to as channelization. Devices that perform this channelization are commonly called RF channelizers or Input Multiplexers (IMUX) or demultiplexers. A common term for entities configured for both the combining and the channelization is a multiplexer (MUX).

For small power (mW) applications there are several technologies already available for multiplexing (such as surface-acoustic-wave (SAW) processing, Low Temperature Co-Fired Ceramic (LTCC) filters, printed circuit boards (PCB)). For higher power applications where the output power from the power amplifier (PA) that is input to the multiplexer is on order of 1 W to ca 20 W, the multiplexer has to have the possibility to handle these power levels. The multiplexer in addition needs to have low losses to account for thermal effect, needs to be compact and needs to have Passive Intermodulation (PIM) stability.

Multiplexers can be designed to handle contiguous multicarrier signals (typically in satellite communication) or noncontiguous multicarrier signals (typically in mobile communication systems).

There are different ways to realize, or implement, multiplexers, with each approach suitable for certain application areas.

FIG. 1 shows an application of a multiplexer 1 in a frequency-division duplexing (FDD) system where simultaneous transmission and reception of signals within the device is realized using a diplexer 5. A signal to be transmitted is first passed through an up-converter 2a, then passed through a PA 3a, then through a transmission (TX) filter 4a, and finally passed to an antenna 6 for transmission. Conversely, a signal to be received is first received at the antenna 6, then passed through a reception (RX) filter 4b, then passed through a low noise amplifier (LNA) 3b and finally passed through a down-converter 2b. The TX filter and the RX filter are part of the diplexer. In essence, the diplexer thus implements the functionality of a multiplexer. Diplexers can be realized in several ways. Commonly, the diplexer realization used in mobile communication systems has two bandpass filters connected using a T junction or common resonator.

Whilst FIG. 1 is conceptually illustrated for transmission of one signal and reception of one signal, a multiband system can be classified by considering the number of simultaneously transmitted and received signals. Generally, there are two main types of such systems. A first type is multiband systems that is configured for transmission and reception of only one carrier at a selected frequency band at a given time. In such multiband systems, the multiplexer has the capability to transmit and receive signals at different frequencies. The choice of which frequency can, for example, be selected by a switch system that selects only one frequency band of operation at a time. A second type is multiband systems that is configured for simultaneous transmission and reception of several carriers. An example of such a multiband system is disclosed in WO 2016/120672 A1. FIG. 2 is a conceptual illustration of the components of a multi-band transmitter circuit 10 as disclosed in WO 2016/120672 A1. The multi-band transmitter circuit 10 includes a multi-port network 210 configured to divide an input multi-band signal 900 comprising signal components at each of a plurality of frequency bands into a plurality of output multi-band signals 902, 904. In some cases, at least two frequency bands of the input multi-band signal goo are not contiguous. The signal 900 may be an amplified signal received from amplification path 14. The multi-band transmitter circuit 10 also includes a plurality of band-specific circulator paths 220, 230. Each band-specific circulator path 220, 230 comprises a circulator. Each circulator is configured to receive the respective output multi-band signal 902, 904 and operate at a respective one of the frequency bands to provide a respective band-specific signal 906, 908. The multi-band transmitter circuit 10 further includes a filter 110 comprising a plurality of band-specific filter elements 112, 114. Each band-specific filter element 112, 114 is coupled to a corresponding circulator and configured to receive the respective band-specific signal 906, 908. Each band-specific filter element 112, 114 operates at the same frequency band as the corresponding circulator to provide a filtered band-specific signal 910, 912 for transmission at an antenna 60.

Existing multiplexers and multiplexing networks are usually limited to several separated frequency bands combined to one output. During the design phase, the network response is controlled and optimized to the frequency bands of use. Parameters such as return loss (RL) and insertion loss (IL) are optimized for selected passbands. The bandwidth of the multiplexers is usually limited by the bandwidths of components used. For hybrid multiplexers, the bandwidth of hybrids determines the multiplexer bandwidth. Similarly, for the circulator, multiplexers concept, the bandwidth of the circulators limits the multiplexer bandwidth. Existing multiplexers, due to limited bandwidths of the single components, are therefore not possible to use in ultrawideband systems. For high power levels, for example as used in mobile base stations such as in transmission and reception points (TRPs), the realizations are lossy and therefore multiplexing is not possible to use. For chain type multiplexers, the loss increases for channels that are at the end of a chain (e.g. hybrid, circulator, or directional filter).

Further, the performance of the multiplexer outside the passbands is not optimized and depends on the type of realization used. Reflective filters have full reflection for frequencies outside of the band. Due to insertion losses (ILs) and RLs this parameter is below zero in practical realizations. Star-type multiplexers have low insertion losses but are more difficult to design and realize since all the filters need to be tuned together. In addition, connecting several filters to one point can be challenging when the number of channels increases.

For ultrawideband systems where the wideband PA together with a digital pre-distorter (DPD) and/or feed forward are used, the performance of the filter network for the whole ultrawideband frequency of operation is important, especially the RL within and outside the frequency bands of operation. The high level of returned power can degrade radio performance and in the worst case destroy ultrawideband PA. At the same time the passbands transmission losses of a multiplexing network shall be kept to as low as possible.

One solution to the above is to provide an ultrawideband low-loss isolator in the signal path after the PA. Unfortunately, such isolators are currently not yet available.

Hence, there is still a need for an improved multiplexer for wideband multicarrier FDD operation.

SUMMARY

An object of embodiments herein is to provide a filter unit for wideband multicarrier FDD operation that addresses the above issues.

According to a first aspect there is presented a filter unit for wideband multicarrier FDD operation. The filter unit comprises a transmission multiplexer (MXT), at least one isolator, and a filter bank. The MXT and the filter bank are connected via the at least one isolator. The MXT is configured to receive a transmission (TX) wideband multicarrier signal as provided by at least one power amplifier (PA), and to provide a first bandpass (BP) filtered TX wideband multicarrier signal to the at least one isolator. The MXT comprises at least one first BP filter structure for first BP filtering of the TX wideband multicarrier signal. The at least one isolator is configured to receive the first BP filtered TX wideband multicarrier signal from the MXT and provide the first BP filtered TX wideband multicarrier signal to the filter bank. The filter bank is configured to receive the first BP filtered TX wideband multicarrier signal from the at least one isolator, and to provide a second BP filtered TX wideband multicarrier signal towards an antenna port. The filter bank comprises at least one more second BP filter structure than there are first BP filter structures for second BP filtering of the first BP filtered TX wideband multicarrier signal to provide the second BP filtered TX wideband multicarrier signal.

According to a second aspect there is presented a radio transceiver device. The radio transceiver device comprises a filter unit according to the first aspect.

Advantageously, the filter unit and the radio transceiver device do not suffer from the above issues.

Advantageously, the filter unit and the radio transceiver device enable the use of wideband PAs for multicarrier ultrawideband systems.

Advantageously, the filter unit and the radio transceiver device result in low RL across the whole ultrawideband frequency band (within and in-between the passbands).

Advantageously, the filter unit and the radio transceiver device result in low IL for the multiplexer.

Advantageously, standard existing isolators (as well as customized) can be used in the filter unit and the radio transceiver device.

Advantageously, the filter unit and the radio transceiver device do not require filters that are in different multiplexer channels to be tuned/designed or/and manufactured together.

Advantageously, the filter unit and the radio transceiver device can be used in high-power applications.

Advantageously, all frequency dependent elements such as filters, multiplexers, circulators/isolators, LNA can be grouped into one independent filter unit.

Advantageously, the radio transceiver device only needs to exchange, or update, the filter unit when changing operating frequency band combination.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for an improved multiplexer for wideband multicarrier FDD operation.

The embodiments disclosed herein therefore relate to a filter unit for wideband multicarrier FDD operation and a radio transceiver device comprising such a filter unit 300.

Figure 1:
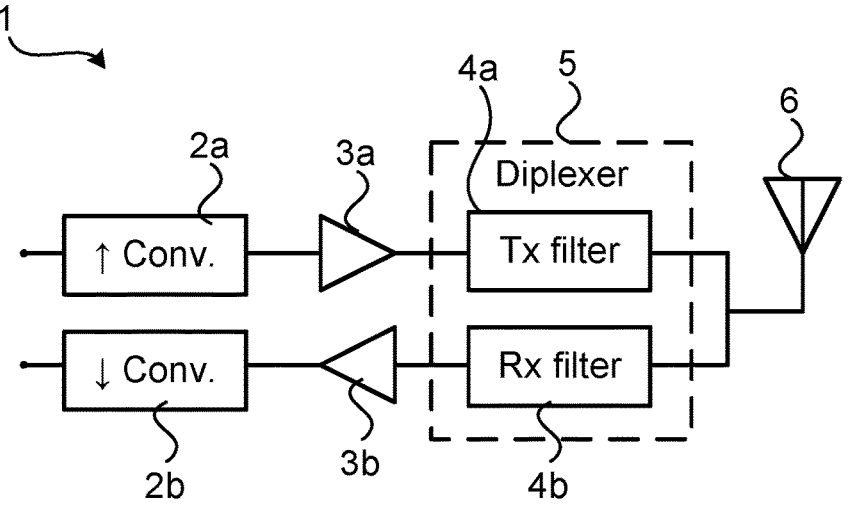
FIG. 1 schematically illustrates an application of a multiplexer in an FDD system according to an example.
Figure 2:
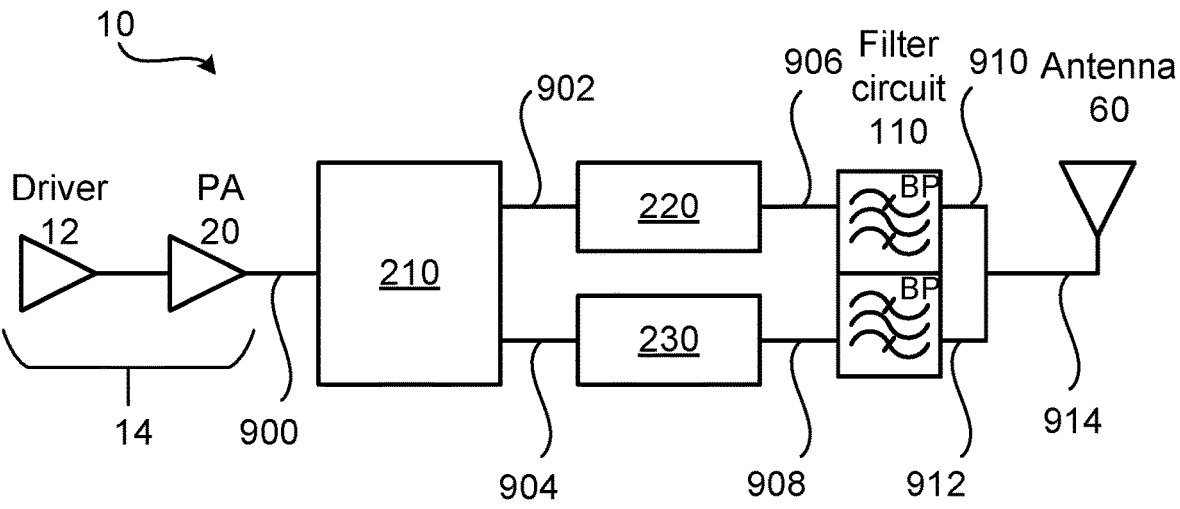
FIG. 2 schematically illustrates components of a multiband transmitter circuit according to an example.
Figure 3:
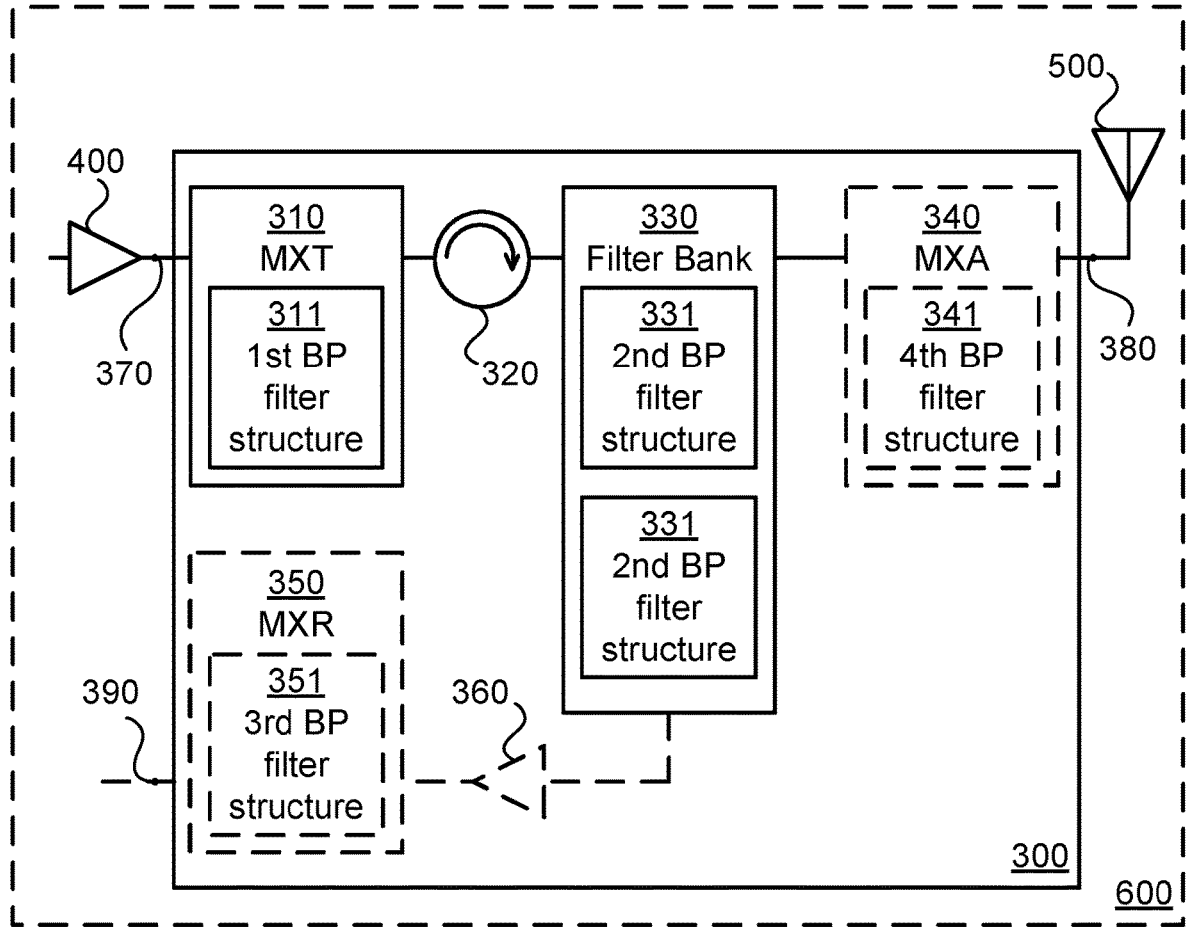
FIGS. 3, 4, and 5 are a block diagrams of filter units for wideband multicarrier FDD operation according to embodiments.

Reference is now made to FIG. 3. FIG. 3 is a block diagram of filter unit 300 for wideband multicarrier FDD operation. The filter unit 300 comprises an MXT 310, at least one isolator 320, and a filter bank 330. The MXT 310 and the filter bank 330 are connected via the at least one isolator 320.

The MXT 310 is configured to receive a TX wideband multicarrier signal as provided by at least one PA 400. The MXT 310 is configured to provide a first BP filtered TX wideband multicarrier signal to the at least one isolator 320. The MXT 310 comprises at least one first BP filter structure 311 for first BP filtering of the TX wideband multicarrier signal.

The at least one isolator 320 is configured to receive the first BP filtered TX wideband multicarrier signal from the MXT 310. The at least one isolator 320 is configured to provide the first BP filtered TX wideband multicarrier signal to the filter bank 330.

The filter bank 330 is configured to receive the first BP filtered TX wideband multicarrier signal from the at least one isolator 320. The filter bank 330 is configured to provide a second BP filtered TX wideband multicarrier signal towards an antenna port 380. The filter bank 330 comprises at least one more second BP filter structure 331 than there are first BP filter structures 311 for second BP filtering of the first BP filtered TX wideband multicarrier signal to provide the second BP filtered TX wideband multicarrier signal.

The TX wideband signal is thus divided at the MXT input into selected multiplexer channels. Each channel can have one or more carriers that are close to each other. A multiplexer channel can cover one or more LTE (3GPP) bands. After each MTX channel the TX wideband signal is passed to a corresponding isolator 320 that will have at least the same bandwidth as each MTX channel. The isolator performance is optimized for the multiplexer channel bandwidth, and not for a single frequency band.

Embodiments relating to further details of the filter unit 300 will now be disclosed.

Aspects of the first BP filter structure 311 in the MXT 310 will now be disclosed. In some embodiments, the filter unit 300 further comprises an input port 370. Each of the at least one first BP filter structure 311 defines a respective first multiplexer channel. Each of the at least one first BP filter structure 311 is configured to, via the input port 370, receive the TX wideband multicarrier signal from the at least one PA 400. Each of the at least one first BP filter structure 311 is configured to BP filter the TX wideband multicarrier signal so as to provide the first BP filtered TX wideband multicarrier signal to the at least one isolator 320.

Aspects of the at least one isolator 320 will now be disclosed. In some embodiments, there are as many isolators 320 as there are first BP filter structures 311. Each isolator 320 has a bandwidth matched to a bandwidth of the first multiplexer channel of the BP filter from which it receives the first BP filtered TX wideband multicarrier signal.

Aspects of the second BP filter structure 331 in the filter bank 330 will now be disclosed. In some embodiments, each second BP filter structure 331 defines a respective second multiplexer channel. Each second BP filter structure 331 is configured to receive the first BP filtered TX wideband multicarrier signal from the isolator 320 to which it is connected. Each second BP filter structure 331 is configured for second BP filtering of the first BP filtered TX wideband multicarrier signal so as to provide the second BP filtered TX wideband multicarrier signal towards the antenna port 380.

Until now the filter unit 300 has been described in the context of transmission of a TX wideband multicarrier signal. Next will be disclosed details of how the filter unit 300 can be adapted for reception of an RX wideband multicarrier signal.

In some embodiments, the filter unit 300 further comprises an output port 390. The filter bank 330 is configured to receive an RX wideband multicarrier signal from the antenna port 380. The filter bank 330 is configured to provide a second BP filtered RX wideband multicarrier signal towards the output port 390. As will be further disclosed next, the RX wideband multicarrier signal might be passed through a low noise amplifier (LNA) 360 and a reception multiplexer (MXR) 350 before reaching the output port 390.

In some aspects there is one or more LNAs 360 between second BP filter structure 331 and the output port 390. Particularly, in some embodiments, the filter unit 300 further comprises at least as many LNAs 360 as there are second BP filter structures 331. There is at least one LNA 360 connected between each of the at least one second BP filter structure 331 and the output port 390.

Aspects of the MXR 350 will now be disclosed. In some embodiments, the filter unit 300 further comprises an MXR 350. The MXR 350 is configured to receive the second BP filtered RX wideband multicarrier signal from the at least one second BP filter structure 331. The MXR 350 is configured to provide a third BP filtered RX wideband multicarrier signal to the output port 390. The MXR 350 comprises at least one third BP filter structure 351 for third BP filtering of the second BP filtered RX wideband multicarrier signal. Output of the MXR 350 is passed to the output port 390.

Aspects of the third BP filter structure 351 in the MXR 350 will now be disclosed. In some embodiments, each of the at least one third BP filter structure 351 defines a respective third multiplexer channel. Each of the at least one third BP filter structure 351 is configured to receive the second BP filtered RX wideband multicarrier signal from the at least one second BP filter structure 331. Each of the at least one third BP filter structure 351 is configured for third BP filtering of the second BP filtered RX wideband multicarrier signal so as to provide the third BP filtered RX wideband multicarrier signal to the output port 390.

In some embodiments, the filter unit 300 further comprises an antenna multiplexer (MXA) 340. The MXA 340 is connected between the filter bank 330 and the antenna port 380.

Aspects of the MXA 340 in the context of transmission of a TX wideband multicarrier signal will now be disclosed. In some embodiments, the MXA 340 is configured to obtain the second BP filtered TX wideband multicarrier signal and provide a third BP filtered TX wideband multicarrier signal to the antenna port 380. The MXA 340 comprises as many fourth BP filter structures 341 as there are first BP filter structures 311 for third BP filtering of the second BP filtered TX wideband multicarrier signal to provide the third BP filtered TX wideband multicarrier signal. Thus, from the isolators 320 the TX wideband multicarrier signal can be transferred to single band or multiband standard duplex filters. All outputs of the duplex filters feed the MXA 340 that combines all signals to one antenna port 380.

Aspects of the MXA 340 in the context of reception of an RX wideband multicarrier signal will now be disclosed. In some embodiments, the MXA 340 is configured to receive the RX wideband multicarrier signal from the antenna port 380. The MXA 340 is configured to provide a first BP filtered RX wideband multicarrier signal to the filter bank 330. The fourth BP filter structure 341 is configured for first BP filtering of the RX wideband multicarrier signal. For RX wideband multicarrier signals the input from the output port 390 is thus distributed to bandpass filters using the MXA

340. The RX wideband multicarrier signals are next passed to LNAs 360 and combined in the MXR 350.

Aspects of the fourth BP filter structure 341 in the MXA 340 will now be disclosed. In some embodiments, each fourth BP filter structure 341 has a passband matched to a passband of a respective one of the at least one first BP filter structures 311. In general terms, the passband of the fourth BP filter structure 341 can be wider or narrower than the passband of the first BP filter structure 311.

In some embodiments, each of the fourth BP filter structure 341 defines a respective fourth multiplexer channel.

Figure 4:
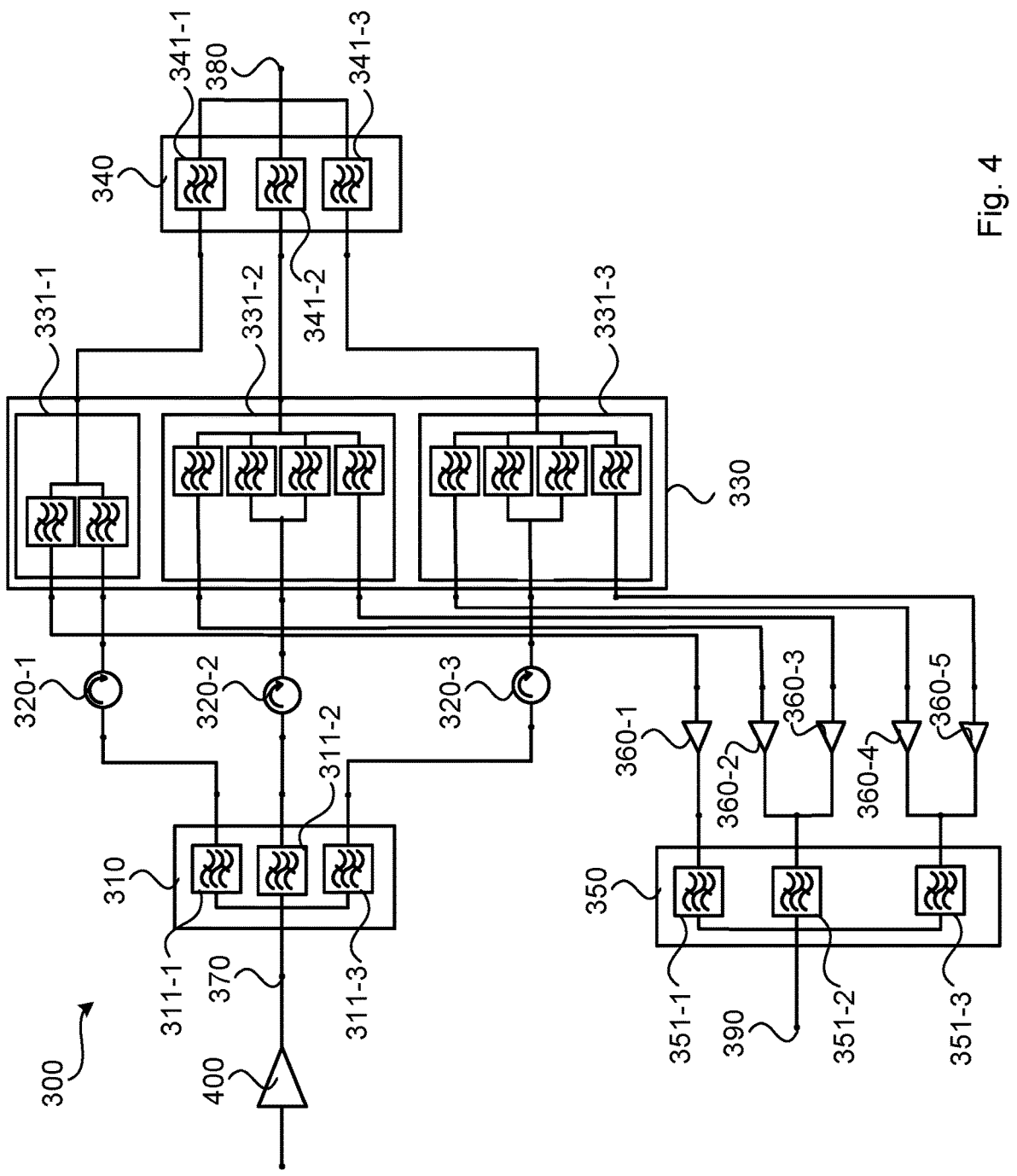
Figure 5:
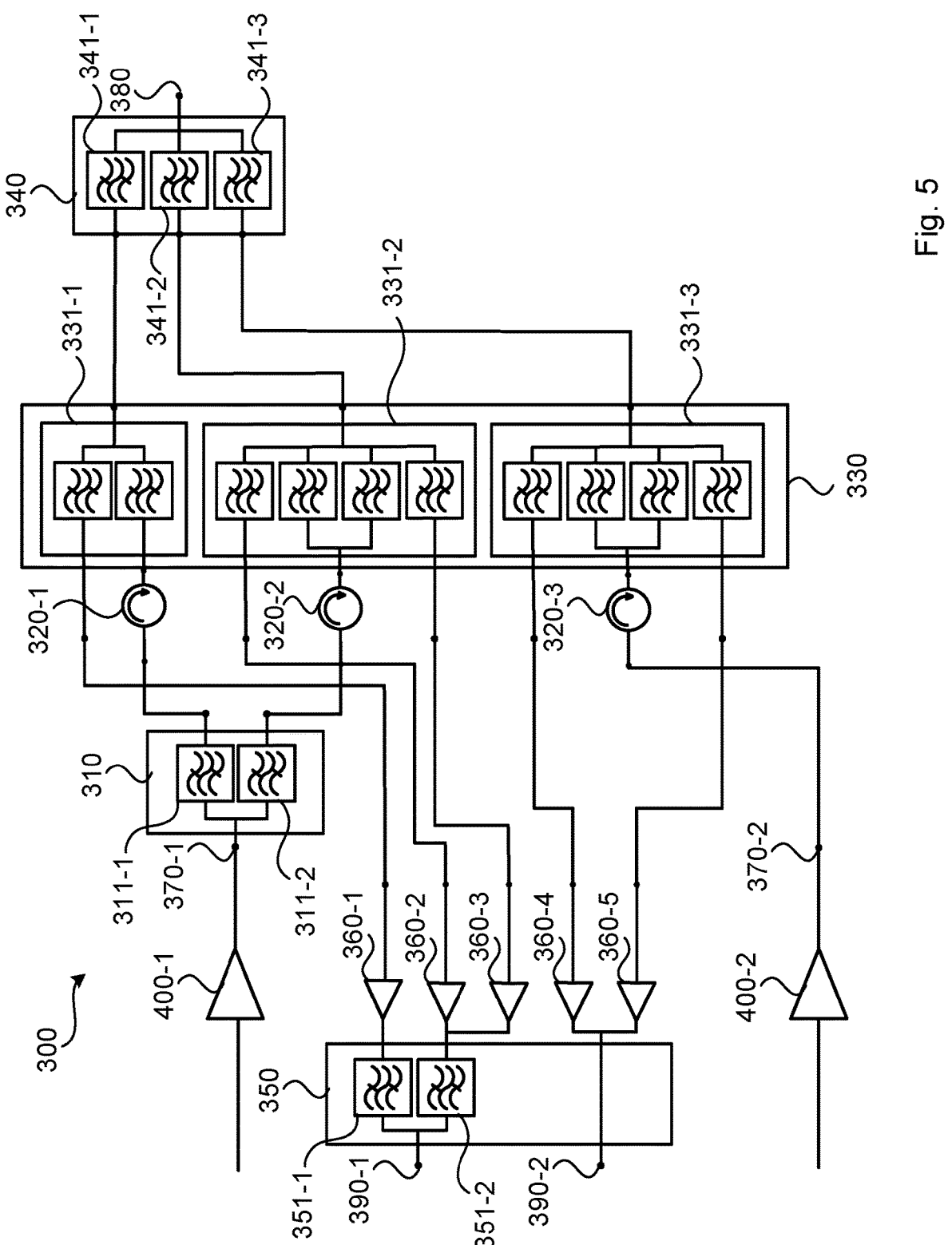

Two example realizations of the thus far described filter unit 300 are illustrated in FIG. 4 and FIG. 5. In both these examples the filter unit 300 is configured for both transmission of a TX wideband multicarrier signal and reception of an RX wideband multicarrier signal and comprises an MXT 310, three isolators 320-1, 320-2, 320-3, a filter bank 330, an MXA 340, five LNAs 360-1, 360-2, 360-3, 360-4, 360-5 and an MXR 350.

Reference is now made to the filter unit 300 of FIG. 4. In this example there is one single input port 370 and one single output port 390.

The MXT 310 comprises three first BP filter structures 311-1, 311-2, 311-3, each composed of a single BP filter, each configured to receive a TX wideband multicarrier signal from the input port 370, and each configured to provide first BP filtered TX wideband multicarrier signals, one to each of the three isolators 320-1, 320-2, 320-3.

The MXT 310 thus provides three channels; a high band channel, a middle band channel and a low band channel. Each channel is connected to corresponding isolator 320-1, 320-2, 320-3.

The filter bank 330 comprises three second BP filter structure 331-1, 331-2, 331-3. For transmission, each of the three second BP filter structures 331-1, 331-2, 331-3 is configured to receive a signal from a respective one of the three isolators 320-1, 320-2, 320-3 and to provide three second BP filtered TX wideband multicarrier signals to the MXA 340. For reception, each of the three second BP filter structures 331-1, 331-2, 331-3 is configured to receive a signal from the MXA 340 and to provide a respective second BP filtered RX wideband multicarrier signals to a respective one of the three isolators 320-1, 320-2, 320-3. One of the three second BP filter structures 331-1 is composed of one BP filter for transmission and one BP filter for reception, whereas two of the three second BP filter structures 331-2, 331-2 are composed of two BP filters each for transmission and two BP filters each for reception. For the high band channel, the filter bank 330 thus applies BP filtering in terms of a single band filter, whereas for the middle band channel and the low band channel, the filter bank 330 thus applies BP filtering in terms of a respective double band filter.

The MXA 340 comprises three third BP filter structures 341-1, 341-2, 341-3. For transmission, each of the third BP filter structures 341-1, 341-2, 341-3 is configured to receive a signal from a respective one of the three second BP filter structures 331-1, 331-2, 331-3 and to provide three third BP filtered TX wideband multicarrier signals to the antenna port 380. Signals from each of the high band channel, the middle band channel, and the low band channel are thus combined in the MXA 340 and then provided to a wideband antenna via the antenna port 380. For reception, each of the three third BP filter structures 341-1, 341-2, 341-3 is configured to receive a signal from the antenna port 380 and to provide a respective second BP filtered RX wideband multicarrier signals to respective one of the five LNAs 360-1, 360-2, 360-3, 360-4, 360-5.

The MXR 350 comprises three fourth BP filter structures 351-1, 351-2, 351-3 each composed of a single BP filter; one for each of the high band channel, the middle band channel, and the low band channel. One of the fourth BP filter structures 351-1 is configured to receive a second BP filtered TX wideband multicarrier signal from one of the LNAs 360-1, whereas two of the fourth BP filter structures 351-2, 351-3 are configured to receive a second BP filtered RX wideband multicarrier signal as combined from two respective LNAs 360-2, 360-3 respective 360-4, 360-5. Each of the fourth BP filter structures 351 is configured to provide a third BP filtered RX wideband multicarrier signal to the output port 390. RX signals from the antenna are thus pass through the MXA 340 and the filter bank 330 to the corresponding LNA 360 before reaching the MXR 350. The output from all LNAs 360 are combined in the MRX 350 and provided to the output port 390.

Reference is now made to the filter unit 300 of FIG. 5. In this example there are two input ports 370-1, 370-2; a high band input port 370-1 and a low band input port 370-2, as well as two output ports 390-1, 390-2; a high band output port 390-1 and a low band output port 390-2. The MXT 310 is connected to the high band input port 370-1 and the MXR 350 is connected to the high band output port 390-1.

The MXT 310 comprises two first BP filter structures 311-1, 311-2, each composed of a single BP filter, each configured to receive a TX wideband multicarrier signal from the high band input port, and each configured to provide first BP filtered TX wideband multicarrier signals, one to each of two of the three isolators 320-1, 320-2. The third isolator 320-3 receives a TX wideband multicarrier signal from the low band input port 370-2. The MXT 310 thus provides two channels; a first high band channel and a second high band channel. Each channel is connected to corresponding isolator 320-1, 320-2, 320-3.

The filter bank 330 comprises three second BP filter structure 331-1, 331-2, 331-3. For transmission, each of the three second BP filter structures 331-1, 331-2, 331-3 is configured to receive a signal from a respective one of the three isolators 320-1, 320-2, 320-3 and to provide three second BP filtered TX wideband multicarrier signals to the MXA 340. For reception, each of the three second BP filter structures 331-1, 331-2, 331-3 is configured to receive a signal from the MXA 340 and to provide a respective second BP filtered RX wideband multicarrier signals to a respective one of the five LNAs 360-1, 360-2, 360-3, 360-4, 360-5. One of the three second BP filter structures 331-1 is composed of one BP filter for transmission and one BP filter for reception, whereas two of the three second BP filter structures 331-2, 331-3 are composed of two BP filters each for transmission and two BP filters each for reception. For the first high band channel, the filter bank 330 thus applies BP filtering in terms of a single band filter, whereas for the second high band channel and the low band channel, the filter bank 330 thus applies BP filtering in terms of a respective double band filter.

The MXA 340 comprises three third BP filter structures 341-1, 341-2, 341-3. For transmission, each of the third BP filter structures 341-1, 341-2, 341-3 is configured to receive a signal from a respective one of the three second BP filter structures 331-1, 331-2, 331-3 and to provide three third BP filtered TX wideband multicarrier signals to the antenna port 380. Signals from each of the first high band channel, the second high band channel, and the low band channel are thus combined in the MXA 340 and then provided to a wideband antenna via the antenna port 380. For reception, each of the three third BP filter structures 341-1, 341-2, 341-3 is configured to receive a signal from the antenna port 380 and to provide a respective first BP filtered RX wideband multicarrier signals to respective one of the three second BP filter structure 331-1, 331-2, 331-3.

The MXR 350 comprises two fourth BP filter structures 351-1, 351-2, each composed of a single BP filters; one for the first high band channel and one for the second high band channel. One of the fourth BP filter structures 351-1 is configured to receive a second BP filtered TX wideband multicarrier signal from one of the LNAs 360-1, whereas the other of the fourth BP filter structures 351-2 is configured to receive a second BP filtered RX wideband multicarrier signal as combined from two respective LNAs 360-2, 360-3. Each of the fourth BP filter structures 351-1, 351-2 is configured to provide a third BP filtered RX wideband multicarrier signal to the high band output port 390-1. The outputs of the two LNAs 360-4, 360-5 not connected to the MXR 350 are combined to form a RX wideband multicarrier signal that is provided to the low band output port 390-2. RX signals from the antenna are thus pass through the MXA 340 and the filter bank 330 to the corresponding LNA 360-1, 360-2, 360-3, 360-4, 360-5 before reaching the MXR 350, or directly to the low band output port 390-2.

Aspects common for the BP filter structures 311, 331, 341, 351 will now be disclosed. It is however noted that these aspects might apply to a single one of the BP filter structures 311, 331, 341, 351, to two of the BP filter structures 311, 331, 341, 351, to three of the BP filter structures 311, 331, 341, 351, or to all of the BP filter structures 311, 331, 341, 351.

Figure 6:
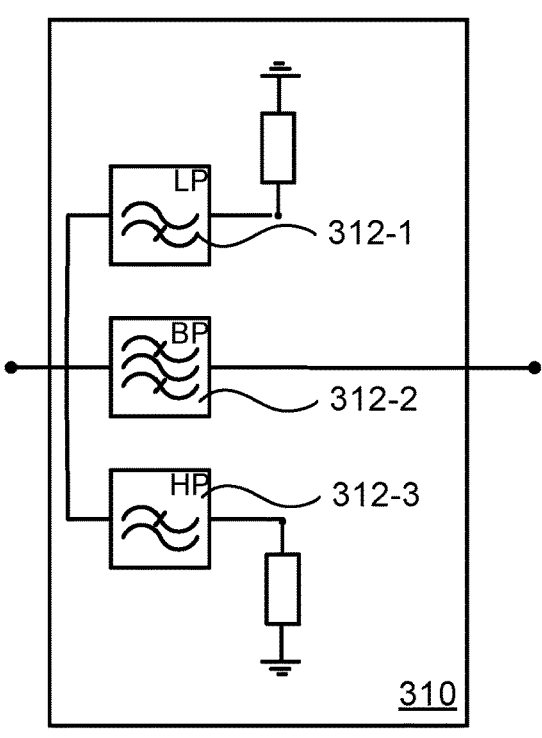
FIGS. 6, 7, 8, 9, and 10 are a block diagrams of MXTs according to embodiments.

In some aspects, the BP structure for one channel is defined by one BP filter in combination with one LP filter and one HP filter for termination. In particular, in some embodiments, at least one of the BP filter structures 311, 331, 341, 351 is composed of a single BP filter, a terminating low pass filter, and a terminating high pass filter. FIG. 6 illustrates an example of this embodiment where the MXT 310 is realized as a connection of LP, BP and HP filters 312-1, 312-2, 312-3. The output of the LP filter 312-1 and the HP filter 312-3 are terminated with a 50 Ohm match to obtain a wideband low RL at the MXT input. The output of the BP filter 312-2 forms one multiplexer channel. Frequencies outside the multiplexer channel are thereby terminated in a low RL load such that the MXT 310 fulfils wideband low RL requirements.

Figure 7:
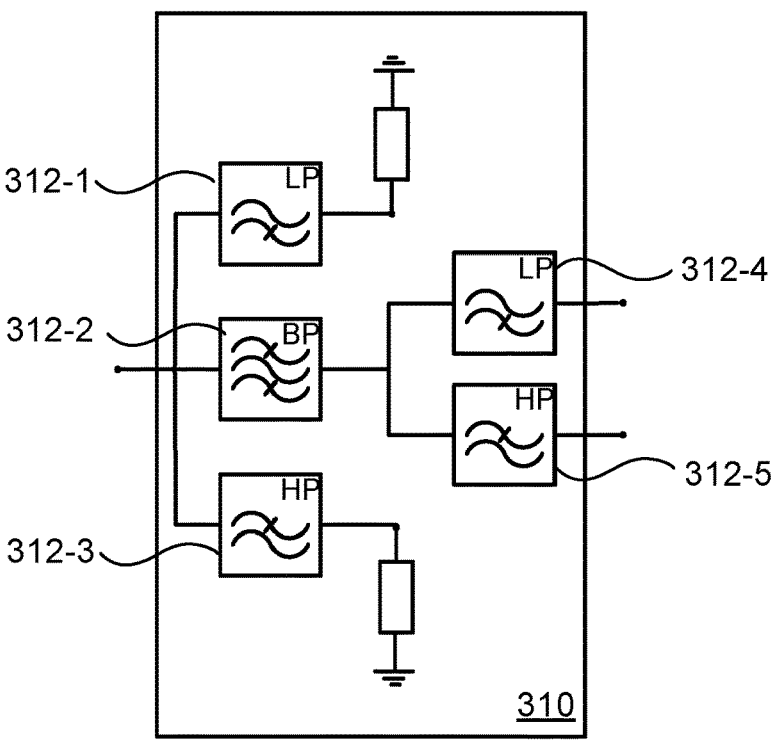

In some aspects, the BP structure for two channels is defined by one BP filter in combination with non-terminating LP and HP filters and in combination with terminating HP and LP filters. In particular, in some embodiments, at least one of the BP filter structures 311, 331, 341, 351 is composed of a single BP filter, a non-terminating low pass filter, a non-terminating high pass filter, a terminating low pass filter, and a terminating high pass filter. FIG. 7 illustrates an example of this embodiment where the MXT 310 is realized as a two-layer structure. Outputs from a first LP filter 312-1 and a first HP filter 312-3 are terminated with a 50 Ohm match whereas the output of the BP filter 312-2 is split to be connected to a second LP filter 312-4 and a second HP filter 312-5. The outputs from the second LP filter 312-4 and the second HP filter 312-5 forms two multiplexer channels. Frequencies outside the multiplexer channels are thereby terminated in a low RL load such that the MXT 310 fulfils wideband low RL requirements.

In some aspects, the BP structure for one or two channels is defined by a combination of HP filters and LP filters. In particular, in some embodiments, at least one of the BP filter structures 311, 331, 341, 351 is composed of a non-terminating LP filter, a non-terminating HP filter, a terminating LP filter, and a terminating HP filter.

Figure 8:
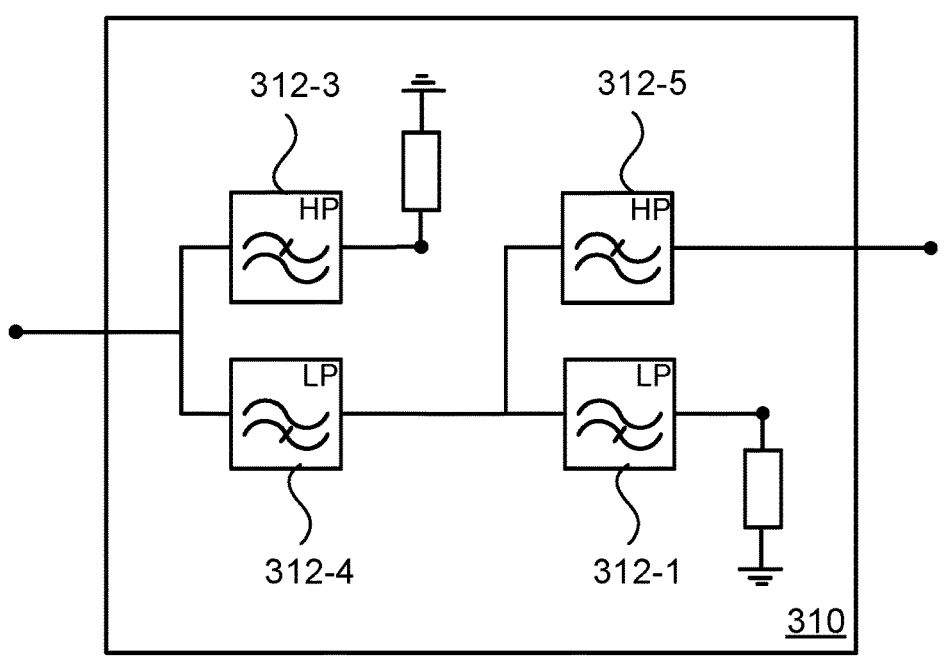

FIG. 8 illustrates a first example of this embodiment where the MXT 310 is realized as a two-layer structure where the input is split into a terminating HP filter 312-3 and a non-terminating LP filter 312-4. The output of the non-terminating LP filter 312-4 is split into a terminating LP filter 312-1 and a non-terminating HP filter 312-5. The output of the non-terminating HP filter 312-5 forms one multiplexer channel. Frequencies outside the multiplexer channel are thereby terminated in a low RL load such that the MXT 310 fulfils wideband low RL requirements.

Figure 9:
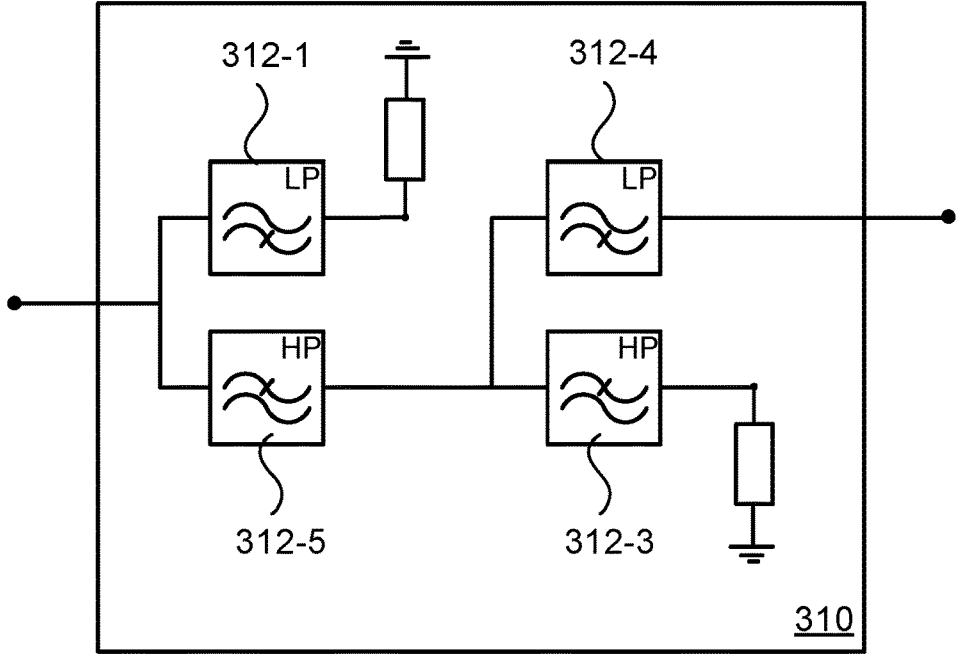

FIG. 9 illustrates a second example of this embodiment where the MXT 310 is realized as a two-layer structure where the input is split into a terminating LP filter 312-1 and a non-terminating HP filter 312-5. The output of the non-terminating HP filter 312-5 is split into a terminating HP filter 312-3 and a non-terminating LP filter 312-4. The output of the non-terminating LP filter 312-4 forms one multiplexer channel. Frequencies outside the multiplexer channel are thereby terminated in a low RL load such that the MXT 310 fulfils wideband low RL requirements.

Figure 10:
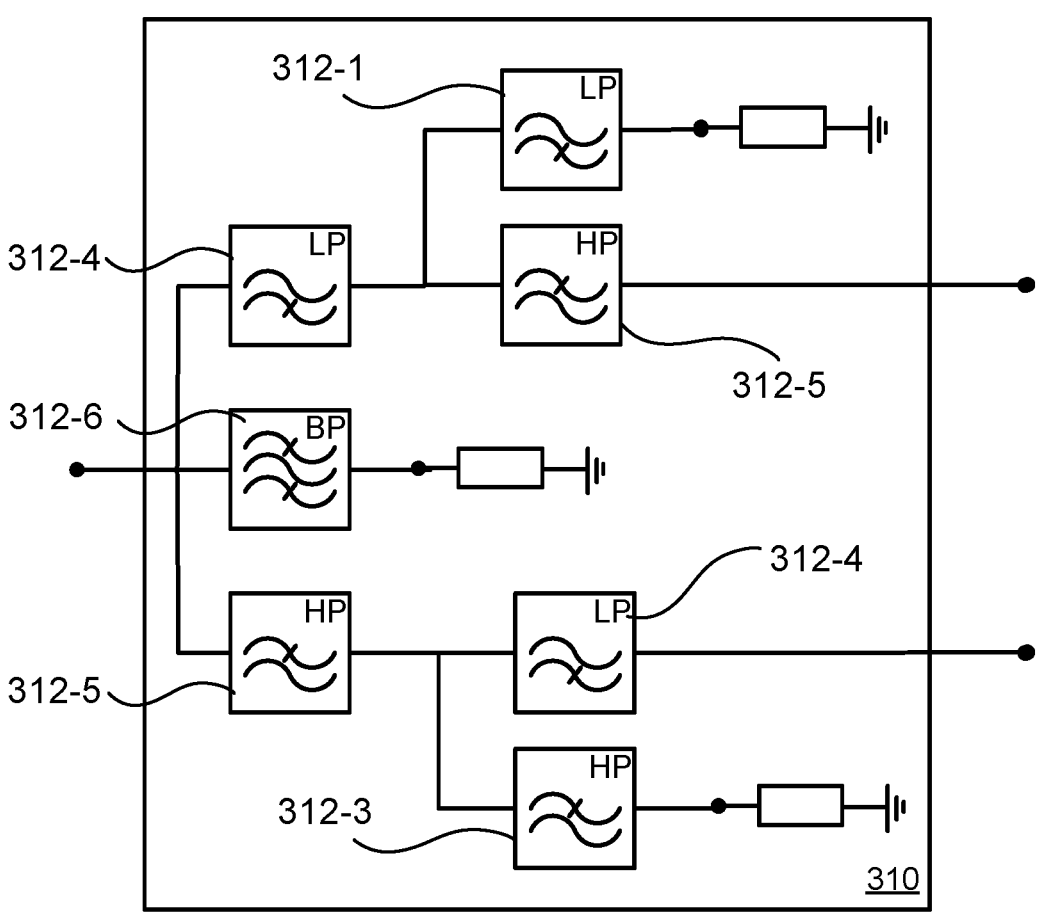

FIG. 10 illustrates a third example of this embodiment where the MXT 310 is realized as a two-layer structure. At a first stage the input is split into a terminating BP filter 312-6, a non-terminating LP filter 312-4 and a non-terminating HP filter 312-5. At a second stage, the output of the non-terminating LP filter 312-4 from the first stage is split into a terminating LP filter 312-1 and a non-terminating HP filter 312-5. The output of the non-terminating HP filter 312-5 at the second stage forms a first multiplexer channel. Also at the second stage, the output of the non-terminating HP filter 312-5 from the first stage is split into a terminating HP filter 312-3 and a non-terminating LP filter 312-4. The output of the non-terminating LP filter 312-4 at the second stage forms a second multiplexer channel. Frequencies outside the multiplexer channels are thereby terminated in a low RL load such that the MXT 310 fulfils wideband low RL requirements.

In some aspects, the filter bank 330 has separate BP filter structures for transmission and reception. That is, in some embodiments, the second BP filter structure 331 comprises separate filters for transmission and reception.

In general terms, with respect to the examples in FIG. 6 to FIG. 10, the filters (HP, BP, LP) should be contiguous. That is, a signal has to pass through one of the filters. Or if it falls right in the middle of the boundary of, e.g., between the LP and HP, the power is split 50-50, passing through them both. As such, there is no power reflected by the filters. If the filters are not continuous, there will be a frequency gap between the filters and any power within this frequency gap cannot pass any of the filters and will be reflected.

Further aspects of the BP filter structures 311, 331, 341, 351 and their relation to LTE frequency bands will now be disclosed. It is here noted that the BP filter structures 311, 331, 341, 351 might alternatively be designed to cover also other frequency bands than those listed below.

In some examples, there are at least three first BP filter structures 311 defining as many first multiplexer channels, each covering its own one or more LTE frequency band. In some examples, there are three first multiplexer channels covering LTE frequency bands 8 and 20, bands 1 and 3, and band 7, respectively.

In some examples, there are at least four second BP filter structures 331 defining as many second multiplexer channels, each covering its own LTE frequency band. In some examples, there are five second multiplexer channels covering LTE frequency bands 20, 8, 3, 1, and 7, respectively.

In some examples, there are at least three third BP filter structures 351 defining as many third multiplexer channels, each covering its own one or more LTE frequency band. In some examples, there are three third multiplexer channels covering LTE frequency bands 8 and 20, bands 1 and 3, and band 7, respectively.

In some examples, there are at least three fourth BP filter structures 341 defining as many fourth multiplexer channels, each covering its own one or more LTE frequency band. In some examples, there are three third multiplexer channels covering LTE frequency bands 8 and 20, bands 1 and 3, and band 7, respectively.

The filter unit 300 can be constructed, realized, or implemented, using a PCB with discrete components, sheet metal structures, air strip line structures or a combination of these or other applicable technologies. For the BP filter structures 311, 331, 341, 351 existing low power multiplexing structures that can used, for example, SAW filter, Bulk Acoustic Wave (BAW) filters, PCB filters, LTCC filters or a combination of these. Duplex bandpass filter structures can be realized in a cavity, mini cavity, dielectric resonator filters with Transverse Electric (TE) mode, Transverse Magnetic (TM) mode, Transverse Magnetic mode with 2 Heights (TM2H) mode, dual mode, triple mode resonators, ceramic filters such as Ceramic Waveguide filters (CWGs), monoblock or a combination of these technologies, optimized for given requirements.

In some aspects the filter unit 300 is provided as a standalone device, or entity. In other aspects the filter unit 300 is provided in, collocated with, or functionally and/or physically integrated with another unit, device, or entity. In particular, in some embodiments, the filter unit 300 is part of a radio transceiver device. Such a radio transceiver device might comprise at least one filter unit 300 as herein disclosed, at least one PA 400 and the antenna port 380.

Figure 11:
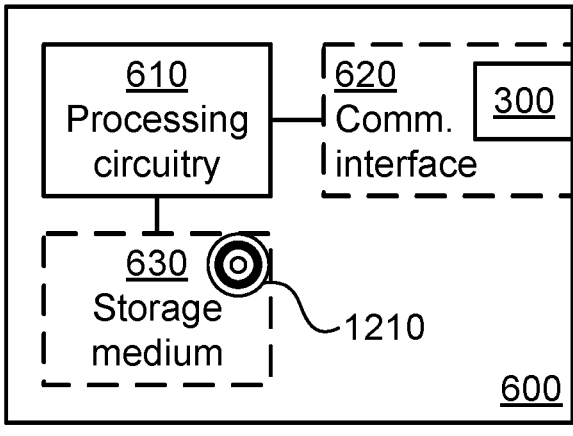
FIG. 11 is a schematic diagram showing functional units of a radio transceiver device according to an embodiment.

FIG. 11 schematically illustrates, in terms of a number of functional units, the components of a radio transceiver device 600 according to an embodiment. Processing circuitry 610 is provided using any combination of one or more of a suitable central processing unit (CPU), multiprocessor, microcontroller, digital signal processor (DSP), etc., capable of executing software instructions stored in a computer program product 310 (as in FIG. 12), e.g. in the form of a storage medium 630. The processing circuitry 610 may further be provided as at least one application specific integrated circuit (ASIC), or field programmable gate array (FPGA).

Particularly, the processing circuitry 610 is configured to cause the radio transceiver device 600 to perform a set of operations, or steps, as disclosed above. For example, the storage medium 630 may store the set of operations, and the processing circuitry 610 may be configured to retrieve the set of operations from the storage medium 630 to cause the radio transceiver device 600 to perform the set of operations. The set of operations may be provided as a set of executable instructions.

Thus the processing circuitry 610 is thereby arranged to execute methods as herein disclosed. The storage medium 630 may also comprise persistent storage, which, for example, can be any single one or combination of magnetic memory, optical memory, solid state memory or even remotely mounted memory. The radio transceiver device 600 may further comprise a communications interface 620 at least configured for communications with other entities, functions, nodes, and devices. As such the communications interface 620 may comprise one or more transmitters and receivers, comprising analogue and digital components. Particularly, the communications interface 620 might comprise at least one filer unit 300 as herein disclosed.

The processing circuitry 610 controls the general operation of the radio transceiver device 600 e.g. by sending data and control signals to the communications interface 620 and the storage medium 630, by receiving data and reports from the communications interface 620, and by retrieving data and instructions from the storage medium 630. Other components, as well as the related functionality, of the radio transceiver device 600 are omitted in order not to obscure the concepts presented herein.

The radio transceiver device 600 might be provided in, collocated with, or functionally and/or physically integrated with another unit, device, or entity, such as any of a (radio) access network node, radio base station, base transceiver station, Node B (NB), evolved Node B (eNB), gNBs, access point, access node, and integrated access and backhaul node, or even a user equipment.

Figure 12:
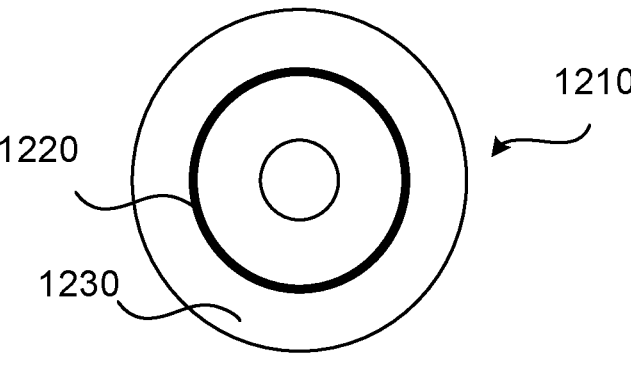
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 610 and thereto operatively coupled entities and devices, such as the communications interface 620 and the storage medium 630, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A filter unit (300) for wideband multicarrier frequency-division duplexing (FDD), operation, the filter unit (300) comprising:
   a transmission multiplexer (MXT) (310);
   at least one isolator (320); and
   a filter bank (330);
   wherein the MXT (310) and the filter bank (330) are connected via the at least one isolator (320);
   wherein the MXT (310) is configured to receive a transmission (TX) wideband multicarrier signal as provided by at least one power amplifier (PA) (400), and to provide a first bandpass (BP) filtered TX wideband multicarrier signal to the at least one isolator (320), wherein the MXT (310) comprises at least one first BP filter structure (311) for first BP filtering of the TX wideband multicarrier signal;

wherein the at least one isolator (320) is configured to receive the first BP filtered TX wideband multicarrier signal from the MXT (310) and provide the first BP filtered TX wideband multicarrier signal to the filter bank (330); and wherein the filter bank (330) is configured to receive the first BP filtered TX wideband multicarrier signal from the at least one isolator (320), and to provide a second BP filtered TX wideband multicarrier signal towards an antenna port (380), wherein the filter bank (330) comprises at least one more second BP filter structure (331) than there are first BP filter structures (311) for second BP filtering of the first BP filtered TX wideband multicarrier signal to provide the second BP filtered TX wideband multicarrier signal.

2. The filter unit (300) according to claim 1, wherein the filter unit (300) further comprises an input port (370), and wherein each of the at least one first BP filter structure (311) is adapted to define a respective first multiplexer channel and is configured to, via the input port (370), receive the TX wideband multicarrier signal from the at least one PA (400), and BP filter the TX wideband multicarrier signal so as to provide the first BP filtered TX wideband multicarrier signal to the at least one isolator (320).

3. The filter unit (300) according to claim 2, wherein there are as many isolators (320) as there are first BP filter structures (311), and wherein each isolator (320) has a bandwidth matched to a bandwidth of the first multiplexer channel of the BP filter from which it receives the first BP filtered TX wideband multicarrier signal.

4. The filter unit (300) according to claim 3, wherein each second BP filter structure (331) is adapted to define a respective second multiplexer channel and is configured to receive the first BP filtered TX wideband multicarrier signal from the isolator (320) to which it is connected, and for second BP filtering of the first BP filtered TX wideband multicarrier signal so as to provide the second BP filtered TX wideband multicarrier signal towards the antenna port (380).

5. The filter unit (300) according to claim 4, wherein there are at least four second BP filter structures (331) defining as many second multiplexer channels, each covering its own LTE frequency band.

6. The filter unit (300) according to claim 2, wherein there are at least three first BP filter structures (311) defining as many first multiplexer channels, each covering its own one or more LTE frequency band.

7. The filter unit (300) according to claim 6, wherein there are three first multiplexer channels covering LTE frequency bands 8 and 20, bands 1 and 3, and band 7, respectively.

8. The filter unit (300) according to claim 1, wherein the filter unit (300) further comprises an output port (390);

wherein the filter bank (330) is configured to receive a reception (RX) wideband multicarrier signal from the antenna port (380), and to provide a second BP filtered RX wideband multicarrier signal towards the output port (390).

9. The filter unit (300) according to claim 8, wherein the filter unit (300) further comprises at least as many low noise amplifiers (LNAs) (360), as there are second BP filter structures (331), wherein there is at least one LNA (360) connected between each of the at least one second BP filter structure (331) and the output port (390).

10. The filter unit (300) according to claim 8, wherein the filter unit (300) further comprises a reception multiplexer (MXR) (350), wherein the MXR (350) is configured to receive the second BP filtered RX wideband multicarrier signal from the at least one second BP filter structure (331), and to provide a third BP filtered RX wideband multicarrier signal to the output port (390), wherein the MXR (350) comprises at least one third BP filter structure (351) for third BP filtering of the second BP filtered RX wideband multicarrier signal.

11. The filter unit (300) according to claim 10, wherein each of the at least one third BP filter structure (351) is adapted to define a respective third multiplexer channel and is configured to receive the second BP filtered RX wideband multicarrier signal from the at least one second BP filter structure (331), and for third BP filtering of the second BP filtered RX wideband multicarrier signal so as to provide the third BP filtered RX wideband multicarrier signal to the output port (390).

12. The filter unit (300) according to claim 8, wherein the second BP filter structure (331) comprises separate filters for transmission and reception.

13. The filter unit (300) according to claim 1, further comprising:

an antenna multiplexer (MXA) (340), wherein the MXA (340) is connected between the filter bank (330) and the antenna port (380), wherein the MXA (340) is configured to obtain the second BP filtered TX wideband multicarrier signal and provide a third BP filtered TX wideband multicarrier signal to the antenna port (380), wherein the MXA (340) comprises as many fourth BP filter structures (341) as there are first BP filter structures (311) for third BP filtering of the second BP filtered TX wideband multicarrier signal to provide the third BP filtered TX wideband multicarrier signal.

14. The filter unit (300) according to claim 13, wherein the MXA (340) is configured to receive the RX wideband multicarrier signal from the antenna port (380), and to provide a first BP filtered RX wideband multicarrier signal to the filter bank (330), wherein the fourth BP filter structure (341) is configured for first BP filtering of the RX wideband multicarrier signal.

15. The filter unit (300) according to claim 13, wherein each fourth BP filter structure (341) has a passband matched to a passband of a respective one of the at least one first BP filter structures (311).

16. The filter unit (300) according to claim 13, wherein each of the fourth BP filter structure (341) is adapted to define a respective fourth multiplexer channel.

17. The filter unit (300) according to claim 1, wherein at least one of the BP filter structures (311, 331, 341, 351) is composed of a single BP filter, a terminating low pass filter, and a terminating high pass filter.

18. The filter unit (300) according to claim 1, wherein at least one of the BP filter structures (311, 331, 341, 351) is composed of a single BP filter, a non-terminating low pass filter, a non-terminating high pass filter, a terminating low pass filter, and a terminating high pass filter.

19. The filter unit (300) according to claim 1, wherein at least one of the BP filter structures (311, 331, 341, 351) is composed of a non-terminating low pass filter, a non-terminating high pass filter, a terminating low pass filter, and a terminating high pass filter.

20. A radio transceiver device (600), the radio transceiver device (600) comprising a filter unit (300) according to claim 1, the at least one PA (400) and the antenna port (380).

* * * * *